May 3, 1960  R. T. BURNETT  2,935,163
AUTOMATIC BRAKE ADJUSTOR
Filed Jan. 2, 1958  2 Sheets-Sheet 1
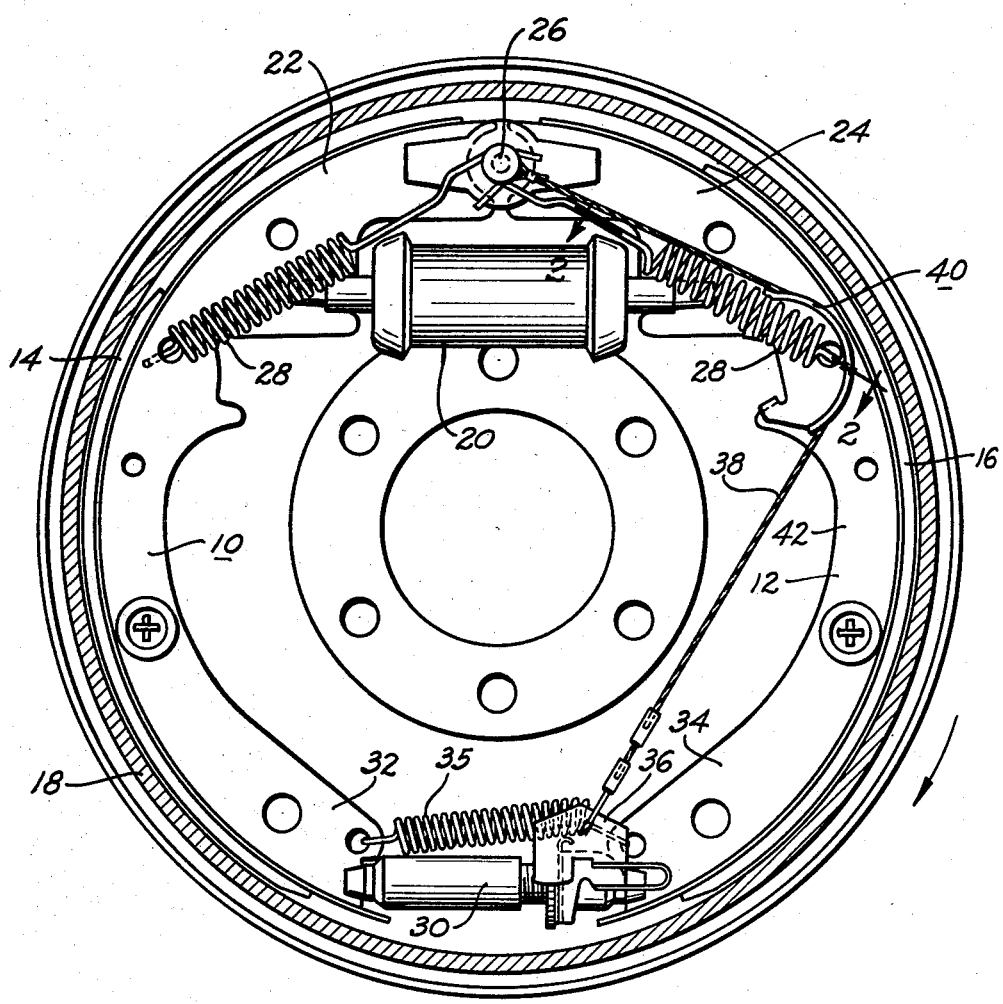
FIG_1
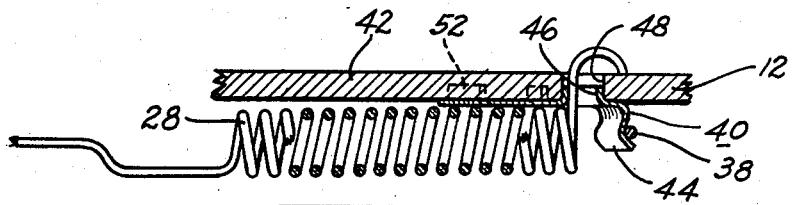
FIG_2
INVENTOR.
RICHARD T. BURNETT.
BY
*John A. Young*
ATTORNEY.

May 3, 1960 R. T. BURNETT 2,935,163
AUTOMATIC BRAKE ADJUSTOR
Filed Jan. 2, 1958 2 Sheets-Sheet 2
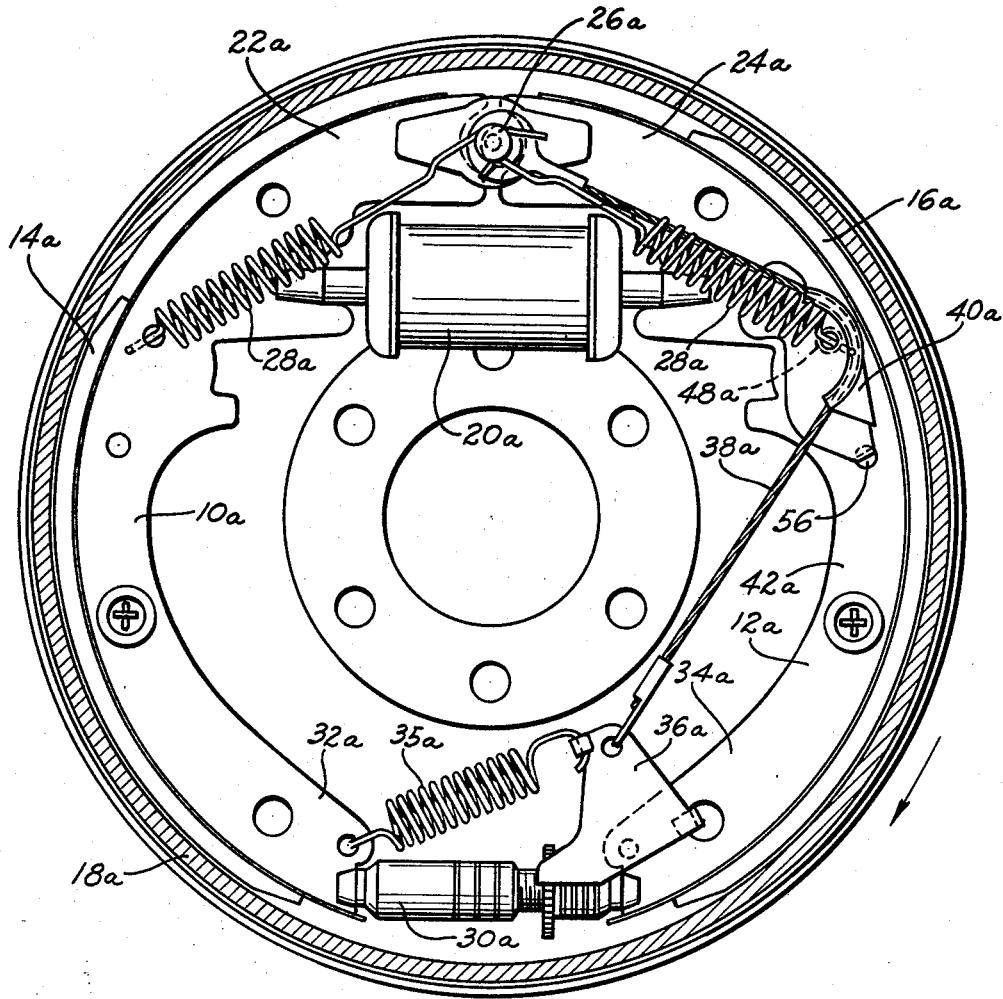
FIG_4
FIG_5
FIG_3
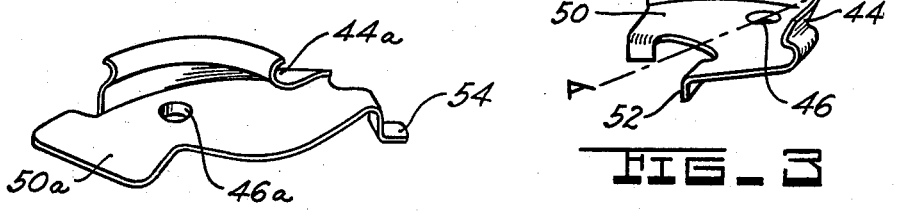
INVENTOR.
RICHARD T. BURNETT.
BY
John A. Young
ATTORNEY.

United States Patent Office 2,935,163
Patented May 3, 1960

2,935,163

AUTOMATIC BRAKE ADJUSTOR

Richard T. Burnett. South Bend, Ind., assignor to Bendix Aviation Corporation, South Bend, Ind., a corporation of Delaware Application January 2, 1958, Serial No. 706,706

5 Claims. (Cl. 188—79.5)

This invention relates to automatic brake adjustors cooperable with internally extending brakes having articulated shoe ends and more particularly this invention relates to a cable guide for use with adjustors of the type disclosed in my copending application Serial No. 433,363, filed June 1, 1954, now abandoned, and in copending application Serial No. 602,866, filed August 8, 1956. It will be apparent, however, that the invention is not restricted to use with these particular types of adjustors but can be utilized in any similar construction which requires means for guiding a cable and operatively connecting it to another brake component. The cable guide which I claim herein as my invention is partially shown in copending application Serial No. 602,866, but is not essential thereto nor is it claimed therein.

The problem of automatic adjustment of brake shoes has long been a concern in the braking art. There have been numerous proposed automatic adjustors which have proved unsatisfactory either because of inherent operational deficiencies or because of prohibitive cost. In order to reduce cost, the number of component parts in the adjustor must approach an ultimate in structural simplicity while still maintaining sufficient structural strength to withstand the rugged use to which brakes are generally subjected. To attain these objectives the adjustors shown in my copending application Serial No. 433,363 and in the copending application 602,866 were developed, both of which utilize as a force transmitting means a flexible cable to aid in attaining structural simplicity. Thus it became necessary to invent some simple means to operatively connect the cable to the brake shoe. This means needs to be simple and must withstand the high orders of force exerted by the cable during operation of the adjusting device.

Accordingly, it is a general object of my invention to provide a guide for an adjustor utilizing a flexible cable.

It is a further object of my invention to provide a cable guide that is structurally sufficient to withstand the high forces exerted thereon by the cable during operation of the adjusting device, and is inexpensive to manufacture.

A still further object of my invention is to provide a cable guide which can be easily installed and removed from the brake assembly and which requires no modification of the standard brake components for its installation and operation.

Concurrently with all of the above objects it is a further object of my invention to provide a cable guide which can be utilized interchangeably on either the left or right-hand shoe of a brake thus eliminating the necessity of manufacturing two different pieces for use on the left and right-hand wheels of a vehicle.

The above and other objects and features of the invention will appear more fully hereinafter from a consideration of the following description, taken in connection with the accompanying drawings, wherein:

Figure 1 is a plan view of a brake assembly and brake adjustor showing one embodiment of my invention;

Figure 2 is a partial section taken along line 2—2 of Figure 1 and showing the method of retaining the cable guide in assembled relation with the web of the shoe;

Figure 3 is an isometric detail view of the cable guide shown in Figure 1;

Figure 4 is a plan view of a brake assembly showing a different type of adjustor mechanism and also showing a second embodiment of my cable guide; and Figure 5 is an isometric detail view of the cable guide shown in Figure 4.

Referring first to the embodiment shown in Figures 1, 2 and 3 the adjuster mechanism is that disclosed in my copending application Serial No. 433,363, to which reference is now made for the complete details of the structure and operation of the adjustor mechanism. However, for purposes of illustrating my invention a brief description and operation of the adjustor mechanism will be given.

A pair of articulated T-section brake shoes 10 and 12 having friction material lining 14 and 16 are adapted for application against a rotatable drum 18 by a fluid motor 20 including a pair of oppositely acting pistons operatively connected to adjacent expansible ends 22 and 24 of the brake shoes 10 and 12. The two shoes 10 and 12 anchor in the fixed anchor post 26 at either of the adjacent expansible ends 22, 24 depending upon the direction of drum rotation to be impeded.

The brake assembly includes suitable return springs such as those indicated at 28. The adjustor is cooperable with an extendible thrust link or strut 30 which interconnects the articulated shoe ends 32 and 34 of the brake shoes 10 and 12. The extendible strut 30 is similar in operation and construction to that disclosed in U.S. Patent 2,105,297, dated January 11, 1938, reference to which is made for details of the operation and construction of the strut 30. A spring 35 maintains the shoe ends 32 and 34 in engagement with the strut 30.

A one piece adjusting mechanism, designated by the reference numeral 36, is operatively connected to the strut 30. The flexible cable 38 has one of its ends connected to the adjustor mechanism 36 and the other end connected to the anchor post 26.

Located intermediate the ends of cable 38 is the cable guide, designated generally by reference numeral 40, which constitutes the present invention. The cable guide 40 provides an operative connection between the cable 38 and the brake shoe 12. As seen best in Figure 2, the cable guide 40 is positioned between the web 42 of the shoe 12 and the return spring 28.

The cable guide 40 has a transverse portion 44 (Figure 3) which forms a curved flange upon which the cable 38 slides and which assists in maintaining the cable in operative position. The guide has an apertured or hollow circular boss 46 (Figure 2) located near the approximate center of the guide. The diameter of this circular boss is approximately equal to that of the hole 48 in the web 42 of shoe 12. As best seen in Figure 2 this circular boss is received in the hole 48 of the shoe web 42.

The guide at its flat portion 50 lies against the shoe web and is contacted by the outer surfaces of the spring 28 (Figure 2). The end of the return spring 28, as shown in Figure 2, extends through the opening in the circular boss 46 and through the hole 48 in shoe 12 and is bent around until the extreme end thereof bears against the back side of the web 42. In this manner, the return spring 28 assists in holding the guide 40 and shoe 12 in assembled relation and particularly prevents any movement of the guide in a direction perpendicular to the web 42 of shoe 12. The cable guide 40 also has two lugs or transverse portions 52 which engage the inner edge of the web 42 and prevent the guide 40 from any turning movement about the circular boss with respect to the web 42.

This simple construction of the cable guide requires no modification of the existing standard brake components. The cable guide is held in place by the return spring 28, and the apertured boss 46 resists the high lateral forces exerted by the cable on the guide during operation of the adjustor mechanism. It should also be noted that the cable guide 40 illustrated in Figures 1-3 is symmetrical about line A—A (Figure 3) and therefore it can be used on either the right or left shoe. In other words, the same cable guide can be used on all four brake assemblies whether they are the brake assemblies for the right or left-hand wheels.

Referring now to the embodiment illustrated in Figures 4 and 5, parts corresponding to those previously described will be referred to by the same reference numeral with the subscript "a" affixed thereto.

The articulated T-section brake shoes 10a and 12a are adapted for application against the rotatable drum 18a by fluid motor 20a operatively connected to the adjacent ends 22a and 24a of the brake shoes 10a and 12a. The two shoes anchor on a fixed anchor post 26a. The other ends of the brake shoes 32a and 34a are interconnected by strut 30a. A one-piece adjusting mechanism or pawl 36a is operatively connected to the end 34a of shoe 12a and engages the adjustor strut 30a. A spring 35a interconnects the pawl 36a and shoe end 32a. A cable 38a has its ends connected to the pawl 36a and the fixed anchor post 26a. Intermediate the ends of the cable 38a and operatively connected to the web 42a of the shoe 12a is the cable guide 40a.

The guide 40a consists of a transverse portion 44a which provides a curved guide surface for the cable 48a. The greatest portion of the guide 40a is a substantially flat portion 50a. Formed in the flat portion 50a is a hollow circular boss 46a which is received in the hole 48a of the web 42a of shoe 12a, the same as in the previous embodiment. The guide 40a is interposed between the return spring 28a and the web 42a as described in the earlier embodiment. To restrain the guide 40a from turning movement about its circular boss 46a, I provide a stepped portion or lug 54 which extends through the hole 56 in the web 42a of shoe 12a. This stepped portion or lug 54 also assists the return spring 28a in restraining the guide 40a from movement in a direction perpendicular to the shoe web 42a. The circular boss 46a resists the high lateral forces exerted by the cable 38a on the guide 40a during operation of the adjustor mechanism. It will be noted that the guide 40a is not symmetrical about any axis and therefore right and left-hand parts are necessary to install the adjustor mechanism on both right and left-hand brake assemblies of a vehicle.

In this embodiment as well as in the previous embodiment, the return spring 28a connected to the shoe 12a, overlies the guide and therefore clamps to the guide against the web 42a of the shoe 12a.

The operation of the adjustor mechanism disclosed in Figures 1-3 is fully described in my copending application Serial No. 433,363 and is basically similar in operation to the adjustor mechanism disclosed in Figures 4 and 5. Therefore, a brief description of the operation of the adjustor mechanism shown in Figures 4 and 5 will be sufficient for a full understanding of the principles of my invention.

An adjustment takes place when the vehicle is moving in a reverse direction with the drum rotating in a clockwise direction as indicated by the arrow in Figure 4. Assuming that the brake linings 14a and 16a have worn sufficiently to acquire an adjustment, the brake shoe 12a will move from the anchor to produce a tensioning of cable 38a. When the curved transverse portion 44a of the guide 40a slides circumferentially in a counterclockwise direction, the end of the cable attached to the pawl 36a is pulled upwardly and pawl 36a is thereby rotated in a clockwise direction. When the pawl 36a is rotated, it engages a successive indentation on the adjustor strut 30a. Thus when the brake is released and the shoe 12a returns to its anchor position, the cable 38a is relaxed and spring 35a turns the pawl 36a in a counterclockwise direction and operates the adjustor strut 30a. This extends the adjustor strut 30a to move the brake shoes closer to the drum and reduce the clearance between the linings 14a and 16a and the engageable drum surface.

Although only two embodiments of my invention have been selected to illustrated the invention, it will be apparent to those skilled in the art that the principles of the invention are broad in scope and are capable of general application. It is intended that such revision and variations of the invention as are reasonably expected on the part of those skilled in the art will be included within the scope of the following claims.

I claim:

1. In a brake having an arcuate shoe consisting of an arcuate rim and a web transverse thereto, a fixed anchor and an extendible strut associated with opposite ends of said shoe, a return spring for holding said shoe in a normal position against said fixed anchor, and means for automatically adjusting the shoe responsive to wear including a pawl operatively combined with said extendible strut and a cable connected at one end to said pawl and connected at the other end to said fixed anchor, the combination with said structure of a guide member for said cable located intermediate the ends of the cable and positioned between said return spring and the web of said shoe, an apertured boss of said guide member received in an opening in said web, the end of said return spring connected to said shoe extending through said apertured boss and hooked so that said end bears against the back side of the web of said shoe in such a way to hold said spring and guide in assembled relation relative to said web, a curved flange portion of said guide disposed substantially perpendicular to said web to receive said cable and permit slidable movement thereon, and at least one portion of said guide formed normal to said web and engageable therewith to prevent turning of said guide relative to said web in a plane parallel thereto.

2. In a brake having an arcuate shoe consisting of an arcuate rim and a web transverse thereto, a fixed anchor and an extendible strut associated with opposite ends of said shoe, a return spring for holding said shoe in a normal position against said fixed anchor, and means for automatically adjusting the shoe responsive to wear including a pawl operatively combined with said extendible strut and a cable connected at one end to said pawl and connected at the other end to said fixed anchor, the combination with said structure of a guide member for said cable located intermediate the ends of the cable and adapted to limit movement of said cable to sliding movement in a plane substantially parallel to the web of said shoe, said guide member including a flat section contiguous to said web, and a hollow circular boss received in an opening in said web, said return spring abutting said flat section and having its end extending through said boss and opening and bearing against said web in such a way to restrain said guide member from movement perpendicular to said web, said guide member being further adapted to prevent turning thereof about said circular boss relative to said web.

3. In a brake having an arcuate shoe consisting of an arcuate rim and a web transverse thereto, a fixed anchor and an extendible strut associated with opposite ends of said shoe, a return spring for holding said shoe in a normal position against said fixed anchor, and means for automatically adjusting the shoe responsive to wear including a pawl operatively combined with said extendible strut and a cable connected at one end to said pawl and connected at the other end to said fixed anchor, the combination with said structure of a guide member for said cable located intermediate the ends of the cable and adapted to receive said cable in such a way to limit movement thereof to movement in a plane substantially parallel to the web of said shoe, said guide member including an apertured boss received in an opening in said web to prevent movement of said guide relative to said web in a plane parallel thereto, and means to restrain said guide member from movement perpendicular to said web, said means including a portion of said return spring which serves to restrain movement of said guide member.

4. In a brake, an arcuate shoe having an arcuate rim and a transverse strengthening web, a fixed anchor located at one end of said shoe to provide resistance to braking force of said shoe, an extendible strut combined with the other end of said shoe, adjustment means for operating said strut responsively to wear of said shoe, a cable connected to said anchor at one end thereof and to said adjustment means at the other end thereof, guide means for said cable intermediate the ends thereof including a portion received through said shoe to interlock said guide means and shoe, means forming a part of said guide means for providing a sliding surface of engagement with said cable which is pulled radially outwardly with movement of said shoe, and a return spring for holding said shoe in a normally retracted position and having one end thereof connected to both said shoe and said guide means to hold them together.

5. In a brake having a brake shoe, an automatic adjuster for adjustably positioning one end of said shoe, a cable for operating said automatic adjuster, a cable guide having a portion thereof adapted to interlock with said shoe, a substantially flat surface of said guide arranged to lie flatly against said shoe, a shoe return spring having one end secured to said shoe and said guide to hold them together, and means forming a raised surface on said guide for slidably receiving said cable thereover and adapted to exert a pulling action on said cable as the shoe is actuated radially outwardly during brake applications to operate said automatic adjuster.

References Cited in the file of this patent

Automotive Industries, publication of April 25, 1936, page 605.